July 22, 1969 — O. OELLIG — 3,456,527
SPEED CONTROL FOR TIME KEEPING DEVICES
Filed Jan. 29, 1968 — 2 Sheets-Sheet 1

INVENTOR
Oskar OELLIG.

July 22, 1969 O. OELLIG 3,456,527
SPEED CONTROL FOR TIME KEEPING DEVICES
Filed Jan. 29, 1968 2 Sheets-Sheet 2

INVENTOR
Oskar OELLIG

United States Patent Office 3,456,527
Patented July 22, 1969

3,456,527
SPEED CONTROL FOR TIME KEEPING DEVICES
Oskar Oellig, Nuremberg, Germany, assignor to Diehl, Nuremberg, Germany
Filed Jan. 29, 1968, Ser. No. 701,363
Claims priority, application Germany, Feb. 1, 1967, D 52,158
Int. Cl. G05g 1/00
U.S. Cl. 74—573                7 Claims

ABSTRACT OF THE DISCLOSURE

Oscillatory member having at least one regulating element thereon spaced radially from the axis of oscillation of the member. The regulating element is adjustable on the oscillatory member about an adjustment axis extending perpendicular to the oscillation axis. The mass of the regulating element is disposed so the center of gravity of the element falls on the adjustment axis while the mass is distributed in different manners along angularly related axes perpendicular to the adjustment axis.

---

The present invention relates to speed control means for time keeping devices, especially to jerk-free balance-like oscillators with which the change of the duration of the oscillation is brought about by a change in the moment of inertia of the oscillator or of masses supported thereby.

Balance oscillating means with which the speed control, instead of changing the effective length of a return spiral spring, is effected by adjusting masses, for instance, weight screws, on the oscillator are generally known. Screwing out of the screw on one side also requires a corresponding change on the opposite side of the balance because the screwing-in and screwing-out of a weight screw will in addition to changing the mass inertia also change the equilibrium so that an unbalance results. Such speed control device is, therefore, awkward to handle and can be adjusted only by an expert. The same remarks applying to the said weight screws also apply to eccentric discs as they are frictionally turnably arranged on balance spokes.

In an effort to simplify the adjustment of such devices which are adjusted by adjusting the mass inertia, it has also been suggested symmetrically to arrange displaceable masses on the balance and by suitable adjusting means to move these masses simultaneously in a direction which will increase or decrease the inertia moment. Thus, for instance, it is known for this purpose to employ spiral cams which extend coaxially to the balance shaft, or to design the inner margin of the balance ring as spiral cams and to press the control masses by springs from the inside against the said cams. By turning a ring carrying the control masses, all control masses are adjusted simultaneously and in the same direction radially with regard to the balance shaft as diclosed for instance in German Patent No. 928,398. The quality of this speed control depends to a great extent not only on the precision of the cams at both sides and on the centric journalling of the rotatable ring but also on the uniformity of the pressing springs and the precise synchronization of the control masses.

According to another heretofore known device which is disclosed in German Patent No. 1,131,154, the fixed portion of the balance comprises tiltable pivoted mass supporting arms which are guided by an adjusting screw and are moved in opposite direction to each other through sliding tracks of an adjusting ring. Also this device requires not only high precision when producing and connecting the mass supporting arms, but also a precise guiding of the sliding members in the tracks of the adjusting member is required.

All heretofore known speed control devices of the above mentioned general type are fundamentally designed symmetrically which means that with each change in the masses a change in the equilibrium is effected. If a change is effected on one side, an identical change has to be effected on the opposite side.

It is, therefore, an object of the present invention to provide a simple device for controlling the speed of an oscillator by changing the mass moment of inertia, according to which it will not be necessary radially with regard to the balance shaft to adjust two or more mass bodies in unison or one after the other by amounts which differ from each other by a fixed ratio.

This object and other objects and advantages of the invention will appear more clearly from the following specification in connection with the accompanying drawings, in which.

Figure 1:
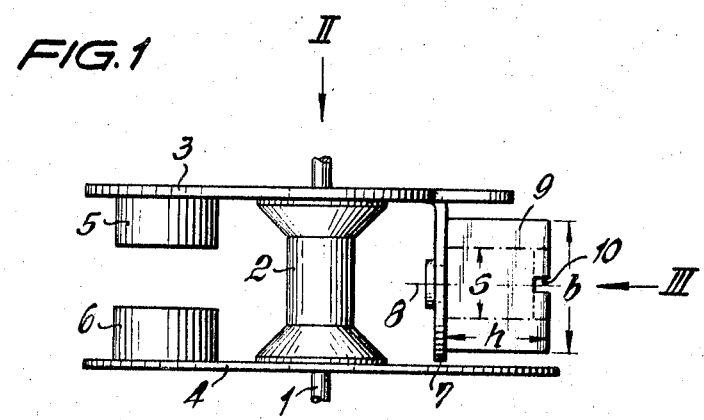
FIG. 1 is a side view of a balance oscillator with a speed control device according to the invention.

According to the present invention it is suggested to rotatably arrange a speed control body which extends radially with regard to the oscillator shaft and is preferably perpendicular thereto. The centers of gravity of the partial masses of the speed control body are differently spaced from the central axis of the speed control body whereby when turning the speed control body, its radius of inertia is variable with regard to the oscillator shaft without adjusting the center of gravity of the total mass. The equilibrium is thus not disturbed by the control operation, even though a mass body is changed in its adjustment. The speed control body may as to shape or mass distribution with regard to the axis of rotation be so designed that the local curve of all partial mass centers of gravity will obtain a curve shape which deviates from a concentric circle about the axis of rotation, preferably a curve shape which, for instance, over 90° ascends by steps of tooth or cam shape. The speed control body may be designed as a rectangular prism, ellipsoid, or as a similar non-rotation symmetric body, preferably however a mirror symmetric body. An oscillator may also be provided with two or more control bodies, preferably of different control magnitudes, for purposes of facilitating the adjustment. Ears or arms in which the control bodies are rotatably connected in a friction-tight manner may be provided with adjusting scales, and the speed control bodies may be provided with markings.

The above outlined speed control device is based on the finding that the inertia moment $J = m \times r^2$ is with regard to an axis variable without changing the mass center of gravity by changing the inertia radius. Thus, the decisive point is not the amount of the mass but its distribution about the axis of rotation. If a speed control body of the above mentioned type, for instance a rectangular prism, is so mounted that by turning the body about its central axis, the inertia distance $r$ is changed, it will be evident that also its total mass inertia moment will be changed.

Since the total center of gravity always remains at the same spot, the equilibrium will not be changed. Thus, no unbalance is created, and it is not necessary to provide two or more of such bodies uniformly distributed over the circumference of the body and equally spaced from the balance shaft, nor to adjust such bodies together and to the same extent. However, it is advantageous, as the case may be, to provide such bodies of different control magnitude and to associate the same with an oscillator. One speed control body with the greater control steepness may be employed for a coarse control, whereas the other preferably smaller body will be employed for a fine control of the duration of the oscillation. Such speed control device can be produced in a simple manner without special devices and without expert knowledge. The speed control device can be actuated by means of a screw driver or the like by any watch owner after oscillator has been stopped.

Referring now to the drawings in detail, FIG. 1 shows a balance shaft 1 having connected thereto by means of a spacer bushing 2 two discs 3 and 4. On one side of said discs 3 and 4 there are respectively mounted permanent magnets 5 and 6. That side of disc 3 which with regard to the shaft 1 is located opposite the permanent magnets 5 and 6 is provided with an ear 7 bent approximately at an angle of 90° with regard to disc 3. A speed control body 9 is frictionally rotatably riveted to or clamped into the ear 7. The said speed control body 9 is rotatable about a shaft 8 which extends radially with regard to the balance shaft 1. The body 9 which in the direction of the shaft 8 has a height $h$ and which has a width $b$ and a lateral length $s$ is provided with an adjusting slot 10 for receiving a screw driver for purposes of turning the body 9. The location of the speed control body 9 turned by 90° with regard to the location indicated by solid lines is shown in FIG. 1 in dot-dash lines. These two positions represent the end positions with regard to the maximum possible control.

Figure 2:
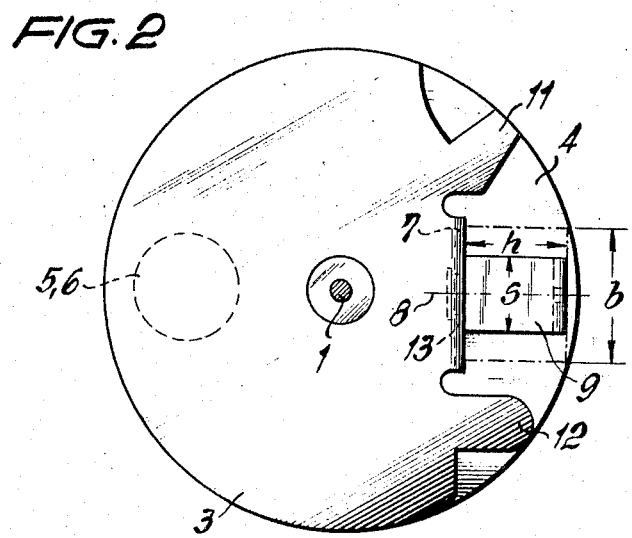
FIG. 2 is a top view of the balance oscillator and of the speed control device as seen when looking in the direction of the arrow II of FIG. 1.

These two positions are also shown in FIG. 2. As will be seen from FIG. 2, the discs 3, 4 are circular. The speed control body 9 is located precisely opposite the magnets 5, 6 and forms a counter weight therefor which means the distance of its total mass inertia point and the distance of the magnets are so selected that the product from distance and mass of the speed control body 9 and from the magnets 5 and 6 is approximately equal. An unbalance equalization is effected for instance on the ears 11, 12 of disc 3 in a non-illustrated manner by adding or withdrawing material. As has been mentioned in connection with FIG. 1, the speed control body 9 is frictionally rotatable about the shaft 8. The axis of shaft 8, the extension of which is perpendicular to the balance shaft 1, coincides with the central axis or axis of symmetry of the mirror symmetrical body 9. The body 9 is mounted on the ear 7 over a central cylindrical extension 13 and is preferably centrically guided in a tight manner on said ear 7. The friction-tight seat is realized by any standard means, as for instance slots in the ear 7, a spring ring disc, or the like. The frictional adherence must be at least so that the body 9 will not be able to adjust itself when the time mechanism is subjected to shocks or rough handling.

Figure 3:
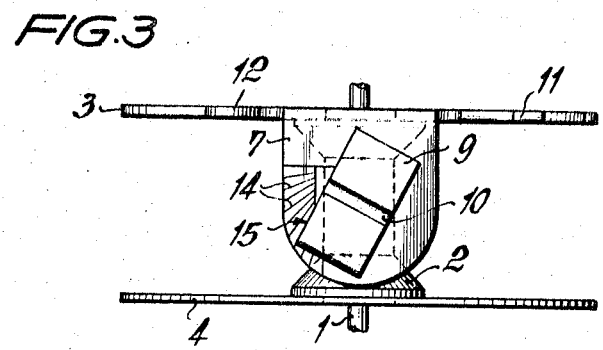
FIG. 3 is a side view of the device according to FIGS. 1 and 2 as seen in the direction of the arrow III of FIG. 1 but with a different adjustment of the control device.

As will be evident from FIG. 3, the ear 7 has embossed scale lines 14. As such scale marking or indicator there may be employed a lateral edge 15 of the speed control body 9. The scale 14 serves for facilitating the adjustment of the duration of the oscillation of the balancer.

Figure 4:
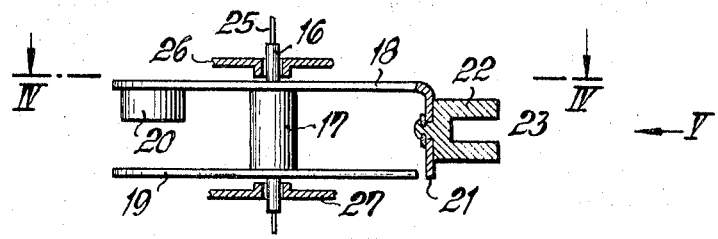
FIG. 4 is a side view of an oscillator with a speed control body according to the invention which differs structurally from that of FIG. 1.
Figure 5:
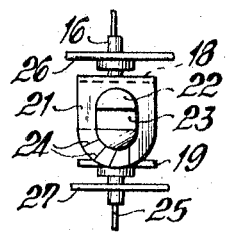
FIG. 5 is a side view of the oscillator according to FIG. 4 as seen in the direction of the arrow V.
Figure 6:
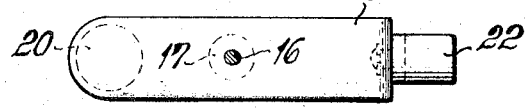
FIG. 6 is a top view of the oscillator according to FIG. 4 as seen in the direction of the arrow VI.

A modified design of the oscillator and of the speed control body is shown in FIGS. 4–6. According to FIG. 4, a clamping band 25 or the like is fastened to an oscillator shaft 16 above and below two strip-shaped oscillator members 18, 19 which are held together by a bushing 17. One side of part 18 of the oscillator has mounted thereon a permanent magnet 20, whereas the opposite side, on a rectangularly bent ear 21, carries a speed control body 22 in the form of an ellipsoid.

As will be evident from FIGS. 4 and 5, this ellipsoid has a wide transverse slot 23 which extends almost to the bottom of the body 22. As FIG. 5 shows, the ear 21 carries a scale 24 which serves as adjusting aid and which is flush with one side of slot 23. In order not to damage the oscillating system, especially the clamping band 25, when adjusting the speed control body 22, the oscillator shaft 16 or oscillator parts 18, 19 have adjacent thereto arranged abutment plates 26, 27 which simultaneously serve as safety means against damage during transport. The said abutment plates 26, 27 are not shown in FIG. 6. The design of the speed control body 22 in the form of an ellipsoid or in the form of a cylinder with a wide and deep transverse recess is again irregular but weight-symmetric with regard to the distribution of the masses. Depending on the position of the slot 23, the partial masses are arranged one below the other and therefore at a short inertia radius or are located horizontally adjacent to each other whereby the radius of the mass center of gravity is greater.

Figure 7:
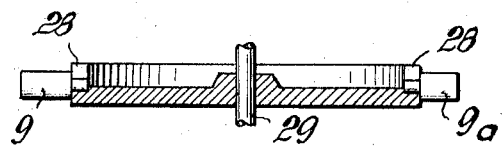
FIG. 7 is a longitudinal section through a balance with two speed control bodies according to the invention and of different control magnitude.
Figure 8:
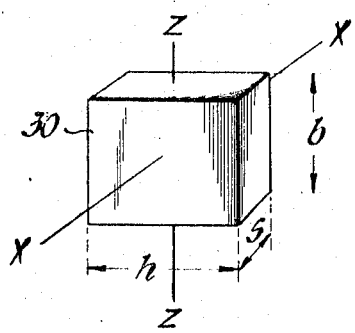
FIG. 8 is a rectangular prism for explaining the employed laws applied in conformity with the invention for changing the inertia moments.

According to FIG. 7, a balancer 28 may have arranged thereon two speed control bodies 9, 9a of different size but establishing a balance relative to shaft 29. These two bodies are preferably offset with regard to each other by 180°. As shown in FIG. 7, these bodies 9, 9a which are directed outwardly may also be connected along a ring 28 in spaced relationship to the balance shaft 29. Important is always the difference in the radii $r$ of the partial centers of gravity, which, according to the above mentioned law, appear squared. This law may be further explained in connection with FIG. 8. As has already been mentioned above, the inertia moment is represented by the equation $J = m \times r^2$, in which $m$ indicates the mass and $r$ indicates the distance of the mass center of gravity from the axis of rotation. With a rectangular prism 30 according to FIG. 8, the inertia moment can be calculated in the following manner and, more specifically, with regard to the $x$-axis:

$$Jx = \tfrac{1}{12} m (b^2 + h^2)$$

and with regard to the z-axis:

$$Jz = \tfrac{1}{12} m (s^2 + h^2)$$

In addition to the height which is contained in both equations, the change is thus determined primarily by the ratio $b^2 : s^2$, which means by the square of the width $b$ to the square of the lateral length $s$. Tests have shown that with a mass of the speed control body 9 of the magnitude of the magnets 5, 6, with a height or radius length $n$ of the body 9 of the magnitude of approximately its width, and with a ratio of $b:s = 2:1$, by rotating the body 30 about its central axis, a fully sufficient control range can be obtained for the duration of the oscillation.

It is, of course, to be understood that the present invention is, by no means, limited to the particular embodiments shown in the drawings but also comprises any modifications within the scope of the appended claims.

What is claimed is:

1. An oscillatory member having a shaft defining an oscillation axis on which the oscillatory member oscillates, and regulating means on said oscillatory member having mass and radially spaced from said axis, said regulating means being rotatbly adjustble on said oscillatory member on adjustment axis means extending radially to said oscillation axis, said oscillatory member taken together with said regulating means being in balance with respect to said oscillatory axis in all adjusted positions of said regulating means, the mass of said regulating means being symmetrically disposed on opposite sides of each of a pair of planes which intersect at right angles and each of which contains said adjustment axis means while the distance of the center of gravity of each portion of the regulating means on opposite sides of one of said planes from said adjustment axis is different than the distance of the center of gravity of each portion of the regulating means on opposite sides of the other of said planes, whereby the period of oscillation of said oscillatory member can be adjusted by rotation of said regulating means on said adjustment axis means without shifting the center of gravity of the combination of said oscillatory member and said regulating means away from said oscillatory axis.

2. An oscillatory member according to claim 1 in which said regulating means comprises a single element.

3. An oscillatory member according to claim 1 in which said regulating means comprises a pair of elements of respectively different control magnitude.

4. An oscillatory member according to claim 2 in which said element is adjustable over a range of at least 90° on said adjustment axis.

5. An oscillatory member according to claim 1 in which said regulating means comprises at least one element in the form of a body exhibiting mirror symmetry with respect to each of said planes.

6. An oscillatory member according to claim 1 in which said oscillatory member comprises a support portion thereon spaced radially from said oscillation axis and disposed in a plane substantially perpendicular to a radius to said oscillation axis, and said regulating means comprising an element mounted on the radially outer side of said support portion.

7. An oscillatory member according to claim 6 in which the radially outer side of said support portion comprises a scale cooperating with said element to indicate the adjusted position of said element on said support portion.

References Cited

UNITED STATES PATENTS

| | | | |
|---|---|---|---|
| 2,665,546 | 1/1954 | Van Haaften | 74—573 XR |
| 3,114,092 | 12/1963 | Maire | 58—28 XR |
| 3,349,640 | 10/1967 | Schneiter | 74—573 |

FRED C. MATTERN, Jr., Primary Examiner

F. D. SHOEMAKER, Assistant Examiner

U.S. Cl. X.R.

58—109